(12) United States Patent
Tseretopoulos et al.

(10) Patent No.: US 10,460,748 B2
(45) Date of Patent: Oct. 29, 2019

(54) CONVERSATIONAL INTERFACE DETERMINING LEXICAL PERSONALITY SCORE FOR RESPONSE GENERATION WITH SYNONYM REPLACEMENT

(71) Applicant: The Toronto-Dominion Bank, Toronto (CA)

(72) Inventors: Dean C. N. Tseretopoulos, Toronto (CA); Robert Alexander McCarter, Ontario (CA); Sarabjit Singh Walia, Demarest, NJ (US); Vipul Kishore Lalka, Oakville (CA); Nadia Moretti, Toronto (CA); Paige Elyse Dickie, Toronto (CA); Denny Devasia Kuruvilla, Toronto (CA); Milos Dunjic, Oakville (CA); Dino Paul D'Agostino, Richmond Hill (CA); Arun Victor Jagga, Toronto (CA); John Jong-Suk Lee, Toronto (CA); Rakesh Thomas Jethwa, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 15/725,095

(22) Filed: Oct. 4, 2017

(65) Prior Publication Data

US 2019/0103127 A1 Apr. 4, 2019

(51) Int. Cl.
*G10L 15/22* (2006.01)
*G10L 25/63* (2013.01)
(Continued)

(52) U.S. Cl.
CPC ............ *G10L 25/63* (2013.01); *G06F 17/277* (2013.01); *G06F 17/2795* (2013.01);
(Continued)

(58) Field of Classification Search
CPC .............. G10L 15/22; G10L 2015/226; G10L 2015/227; G10L 25/63; G06F 17/277; G06F 17/2795
(Continued)

(56) References Cited

U.S. PATENT DOCUMENTS 5,357,596 A 10/1994 Takebayashi et al.
6,070,142 A 5/2000 McDonough et al.
(Continued)

OTHER PUBLICATIONS

"Chatbot API Documentation," [retrieved from Internet on Oct. 4, 2017] https://www.personalityforge.com/chatbot-api-docs.php, 9 pages.
(Continued)

*Primary Examiner* — Martin Lerner
(74) *Attorney, Agent, or Firm* — Fish & Richardson P.C.

(57) ABSTRACT

The present disclosure involves systems, software, and computer implemented methods for personalizing interactions within a conversational interface based on an input context. One example system performs operations including receiving a conversational input received via a conversational interface. The conversational input is analyzed to determine an intent and lexical personality score based on the input's characteristics. A set of responsive content is determined and includes a set of initial tokens representing an initial response. A set of synonym tokens associated with at least some of the initial tokens are identified, and at least one synonym token associated with a similar lexical personality score to the input is determined. At least one of the initial tokens are replaced with the determined synonym token to generate a modified version of the set of response content. The modified version of the response is then transmitted to a device in response to the input.

16 Claims, 6 Drawing Sheets

(51) Int. Cl.
 G06Q 50/00 (2012.01)
 G10L 15/18 (2013.01)
 G06F 17/27 (2006.01)
 G10L 15/187 (2013.01)
(52) U.S. Cl.
 CPC ............ G06Q 50/01 (2013.01); G10L 15/187 (2013.01); G10L 15/1815 (2013.01)
(58) Field of Classification Search
 USPC ...................... 704/9, 10, 231, 257, 270, 275
 See application file for complete search history.

(56) References Cited

U.S. PATENT DOCUMENTS

| | | |
|---|---|---|
| 7,266,499 B2 | 9/2007 | Surace et al. |
| 7,920,682 B2 | 4/2011 | Byrne et al. |
| 7,933,399 B2 | 4/2011 | Knott et al. |
| 7,996,479 B2* | 8/2011 | Pilgrim ................ G06Q 10/107 709/206 |
| 8,032,355 B2* | 10/2011 | Narayanan ............ G06F 17/277 704/2 |
| 8,204,747 B2 | 6/2012 | Kato et al. |
| 8,296,246 B2 | 10/2012 | Hamilton, II et al. |
| 8,462,935 B2 | 6/2013 | Odinak et al. |
| 8,468,168 B2 | 6/2013 | Brezina |
| 8,660,924 B2 | 2/2014 | Hoch et al. |
| 8,818,926 B2 | 8/2014 | Wallace |
| 9,386,152 B2 | 7/2016 | Riahi et al. |
| 9,390,087 B1 | 7/2016 | Roux et al. |
| 9,390,706 B2 | 7/2016 | Gustafson et al. |
| 9,413,891 B2 | 8/2016 | Dwyer et al. |
| 9,444,940 B2 | 9/2016 | Skiba et al. |
| 9,460,083 B2 | 10/2016 | Fink et al. |
| 9,531,862 B1 | 12/2016 | Vadodaria |
| 9,665,558 B2 | 5/2017 | Bastide et al. |
| 9,906,478 B2 | 2/2018 | Akavaram et al. |
| 10,137,902 B2* | 11/2018 | Juneja ..................... G10L 13/04 |
| 2001/0053969 A1* | 12/2001 | Hogenhout ............ G10L 15/183 704/257 |
| 2002/0029203 A1 | 3/2002 | Pelland et al. |
| 2003/0144846 A1* | 7/2003 | Denenberg .................... 704/277 |
| 2003/0167167 A1* | 9/2003 | Gong ..................... G10L 15/22 704/250 |
| 2006/0129383 A1* | 6/2006 | Oberlander ............ G06F 17/274 704/10 |
| 2006/0287865 A1* | 12/2006 | Cross, Jr. ................ G10L 15/22 704/275 |
| 2008/0096533 A1 | 4/2008 | Manfredi et al. |
| 2009/0306979 A1* | 12/2009 | Jaiswal .................. G10L 15/063 704/235 |
| 2011/0066636 A1 | 3/2011 | Guido et al. |
| 2011/0231792 A1* | 9/2011 | Tan ....................... G06Q 10/107 715/810 |
| 2012/0072424 A1 | 3/2012 | Weising |
| 2012/0296642 A1* | 11/2012 | Shammass ............... G10L 25/63 704/211 |
| 2014/0129218 A1* | 5/2014 | Liu ......................... G10L 15/32 704/231 |
| 2014/0136201 A1* | 5/2014 | Hecht .................... G10L 15/065 704/244 |
| 2014/0136202 A1* | 5/2014 | Sims, III ............... G10L 15/065 704/244 |
| 2014/0136214 A1* | 5/2014 | Winter .................... G10L 15/22 704/275 |
| 2014/0279050 A1 | 9/2014 | Makar et al. |
| 2014/0297277 A1 | 10/2014 | Zechner et al. |
| 2014/0310001 A1 | 10/2014 | Kalns et al. |
| 2015/0082205 A1 | 3/2015 | Nathan et al. |
| 2015/0089409 A1 | 3/2015 | Asseily et al. |
| 2015/0134456 A1 | 5/2015 | Baldwin |
| 2015/0186155 A1 | 7/2015 | Brown |
| 2016/0171387 A1 | 6/2016 | Suskind |
| 2016/0236690 A1* | 8/2016 | Juneja ..................... G10L 13/04 |
| 2016/0328124 A1* | 11/2016 | Tan ......................... G06F 17/28 |
| 2016/0328949 A1 | 11/2016 | Zhong |
| 2017/0063775 A1* | 3/2017 | Akolkar ............... G06Q 30/0254 |
| 2017/0323011 A1* | 11/2017 | Byron ............... G06F 17/30675 |
| 2018/0061408 A1* | 3/2018 | Andreas ................. G10L 15/063 |
| 2018/0189630 A1* | 7/2018 | Boguraev ......... G06F 17/30684 |
| 2018/0190278 A1* | 7/2018 | Gupta ..................... G10L 15/22 |
| 2018/0203846 A1* | 7/2018 | Cohen .................. G06F 17/279 |
| 2018/0240459 A1* | 8/2018 | Weng ...................... G10L 15/26 |
| 2019/0103102 A1* | 4/2019 | Tseretopoulos ......... G10L 15/22 |

OTHER PUBLICATIONS

Murrel, "Giving Your Personal Assistant Personality," https://medium.com/on-advertising/giving-your-personal-assistant-a-personality-f3f659f3434d, Jun. 7, 2016, 6 pages.

Zilnik, "Designing a Chatbot's Personality," https://chatbotsmagazine.com/designing-a-chatbots-personality-52dcf1f4df7d, Nov. 8, 2016, 11 pages.

Patrik, "Chatbots are Getting Smarter with Emotional Intelligence," https://webcache.googleusercontent.com/search?q=cache:HhGw4LeJ16cJ:https://chatbotslife.com/chatbots-are-getting-smarter-with-emotional-intelligence-9ea5cb573d54+&cd=1&hl=en&ct=clnk&gl=us, May 24, 2016, 6 pages.

* cited by examiner

Input Table 220

| Formality Score | Politeness Score | Sentence |
|---|---|---|
| 1 | 0.75 | "That isn't what I was looking for, could you please help me find it" |
| 0.8 | 0.85 | "I know this is hard to find, if you could please help me I'd highly appreciate it" |
| 1 | 0.15 | "I see you aren't very intelligent, because if you were you would assist me in finding it" |
| 0.5 | 0.1 | "Man, you are stupid, you can't even help me find this" |
| 0.1 | 0.95 | "my bad, I can't find it, please help me out and I'll owe you one" ← 221 |
| 0 | 0 | "[curse word], I can't find it" |

Synonym Table 235

| | | Sentence | | Formality Score | Politeness Score |
|---|---|---|---|---|---|
| Base Words | 236 | Help | You find it Sir/Miss | 1 | 1 |
| Synonyms 1 | | No problem, I'll | Assist you to the best of my ability | In finding what you are looking for | 0.7 | 1 |
| Synonyms 2 | 237 | Of course I'll | Do you a Solid | Get it for you real quick | 0.1 | 0.9 |
| Synonyms 3 | 238 | I got you | Don't sweat it | I'll have it in no time | 0.1 | 0.7 |

FIG. 2B

CONVERSATIONAL INTERFACE DETERMINING LEXICAL PERSONALITY SCORE FOR RESPONSE GENERATION WITH SYNONYM REPLACEMENT

TECHNICAL FIELD

The present disclosure relates to computer-implemented methods, software, and systems for personalizing interactions within a conversational interface based on an input context and, in some instances, social network information associated with a user associated with the input.

BACKGROUND

Digital, or virtual, personal assistants such as Apple's Siri, Google's Assistant, Amazon's Alexa, Microsoft's Cortana, and others provide solutions for performing tasks or services associated with an individual. Such digital personal assistants can be used to request and perform various data exchanges, including transactions, social media interactions, search engine queries, and others. Additionally, similar functionality can be incorporated into web browsers and dedicated applications. Digital assistants may be one type of conversational interface, where users can input a request or statement into the conversational interface and receive semantic output responsive to the original input. Conversational interfaces may be included in social networks, mobile applications, instant messaging platforms, websites, and other locations or applications. Conversational interfaces may be referred to as or may be represented as chat bots, instant messaging (IM) bots, interactive agents, or any other suitable name or representation.

Conversational interfaces are commonly integrated into dialog systems of these digital assistants or into specific applications or platforms, and can be used to engage in interactions from casual conversations to expert system analysis. Conversational interfaces may accept inputs and/or output responses in various formats, including textual inputs and/or outputs, auditory inputs and/or outputs, video-captured inputs (e.g., via facial movement input), or video or other animated output.

SUMMARY

The present disclosure involves systems, software, and computer implemented methods for personalizing interactions within a conversational interface. A first example system includes a communications module, at least one memory storing instructions and a repository of synonym tokens, and at least one hardware processor interoperably coupled with the at least one memory and the communications module. The repository of synonym tokens can include synonym tokens for association with one or more received inputs, where each of the synonym tokens associated with a corresponding predefined lexical personality score. The instructions stored in the at least one memory can instruct the at least one hardware processor to perform various operations. For example, the instructions can cause the at least one processor to receive, via the communications module, a first signal including a conversational input received via interactions with a conversational interface. The received conversational input can be analyzed via a natural language processing engine to determine an intent of the received conversational input and a lexical personality score of the received conversational input. The determined intent and the determined lexical personality score can be based on characteristics included within the received conversational input. Next, a set of response content responsive to the determined intent of the received conversational input can be determined, where the response content includes a set of initial tokens representing an initial response to the received conversational input. A set of synonym tokens associated with at least some of the set of initial tokens can be identified, and, from the identified set of synonym tokens, at least one synonym token associated with a lexical personality score similar to the determined lexical personality score of the received conversational input can be determined. At least one token from the set of initial tokens included in the determined set of response content can be replaced with the at least one determined synonym token to generate a modified version of the set of response content. In response to the received first signal and via the communications module, a second signal including the modified version of the set of response content can be transmitted to a device associated with the received conversational input.

Implementations can optionally include one or more of the following features.

In some instances, the received conversational input comprises a semantic query, wherein the intent of the conversational input is the semantic query.

In some instances, the determined lexical personality score of the received conversational input comprises at least a first score representing a relative politeness of the received conversational input and a second score representing a relative formality of the received conversational input.

In some of those instances, the determined lexical personality score of the received conversational input can comprise a third score representing an identification of at least one regional phrase included within the received conversational input.

The received conversational input can, in some instances, comprise textual input received via the conversational interface.

In some instances, the received conversational input comprises audio input comprising a verbal statement received via the conversational interface. In some of those instances, the determined lexical personality score of the received conversational input can comprise a third score representing a determined accent of a speaker associated with the verbal statement. In those instances, determining the at least one synonym token associated with the lexical personality score similar to the determined lexical personality score of the received conversational input can include determining at least one synonym token associated with the determined accent.

In some instances where the input comprises audio input, the determined lexical personality score of the received conversational input can comprise a third score representing a verbal tone of a speaker associated with the verbal statement. In those instances, determining the at least one synonym token associated with the lexical personality score similar to the determined lexical personality score of the received conversational input can include determining at least one synonym token associated with the determined verbal tone of the speaker.

In some instances, each token in the set of initial tokens representing the initial response to the received conversational input can comprise a particular phrase within a responsive sentence represented by the set of response content. Each of the identified set of synonym tokens can then comprise a phrase having a similar meaning to at least one of the particular phrases in the responsive sentence.

In some instances, the modified version of the set of response content corresponds to at least a formality and politeness level of the received conversational input.

A second example system includes a communications module, at least one memory, and at least one hardware processor interoperably coupled with the at least one memory and the communications module. The at least one memory can store instructions, a plurality of user profiles, and a repository of persona-related contextual content associated with a plurality of personas, where the persona-related contextual content is for use in personalizing at least one response generated in response to a conversational contextual input. The instructions can instruct the at least one hardware processor to receive, via the communications module, a first signal including a conversational input received via interactions with a conversational interface. The conversational input is associated with a particular user profile, which is itself associated with a set of social network activity information. The received conversational input is analyzed via a natural language processing engine to determine an intent of the received conversational input and to determine a personality input type of the received conversational input. A persona response type associated with the determined personality input type is identified, and a set of response content responsive to the determined intent of the received conversational input is determined. A particular persona associated with the particular user profile is identified based on the set of social network activity information and corresponding to the identified persona response type is identified, where the particular persona is associated with a set of persona-related content. The set of response content is then modified using at least a portion of the persona-related content to generate a persona-associated response. A second signal is then transmitted via the communications module to a device associated with the particular user profile, the second signal including the persona-associated response for presentation in response to the received conversational input.

Implementations can optionally include one or more of the following features.

In some instances, the determined personality input type is one of a plurality of predefined personality input types, wherein each predefined personality input type is mapped to a persona response type.

In some instances, identifying a particular persona associated with the particular user profile is further based on at least one of a current context of the particular user profile, a financial history of the particular user profile, and a financial analysis associated with the particular user profile.

In some instances, the determined intent associated with the received conversational input is associated with a question, and wherein determining the set of response content responsive to the determined intent of the received conversational input comprises determining a responsive answer to the question. In those instances, the responsive answer to the question can be associated with a preferred action to be performed by the user associated with the particular user profile, wherein identifying the particular persona associated with the particular user profile based on the associated set of social network activity includes identifying the particular persona based on the preferred action to be performed by the user.

In some instances, the set of social network activity information is stored remotely from the particular user profile, wherein the particular user profile is associated with at least one social network account, and wherein the set of social network activity is accessed in response to the conversational input and prior to identifying the particular persona associated with the particular user profile.

In some instances, the set of social network activity information identifies at least one social network account followed by, liked, or subscribed to by the particular user profile, and identifying the particular persona associated with the particular user profile can comprise identifying a particular persona from the plurality of personas corresponding to the at least one social network account followed by, liked, or subscribed to by the particular user profile.

In alternative or additional instances, the set of social network activity information identifies at least one social network account with which the particular user profile has previously had a positive interaction, and identifying the particular persona associated with the particular user profile can comprise identifying a particular persona from the plurality of personas corresponding to the at least one social network account with which the particular user profile has had the positive interaction.

In some instances, for each of the personas, the persona-related contextual content includes a set of common phrases or words associated with the particular persona. Modifying the set of response content using at least a portion of the persona-related contextual content to generate a persona-associated response for the particular user can include incorporating at least one common phrase or word associated with the identified particular persona into the set of response content. In some instances, incorporating the at least one common phrase or word associated with the identified particular persona into the set of response content comprises replacing at a portion of the set of response content with at least one common phrase or word associated with the identified particular persona.

In some instances, for at least some of the personas, the persona-related contextual content includes a voice associated with the persona, and wherein modifying the set of response content using at least a portion of the persona-related contextual content to generate a persona-associated response for the particular user comprises generating an audio file for use in presenting the set of response content spoken in the voice associated with the identified particular persona.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 2A-2B is an illustration of a data and control flow of example interactions performed by a system performing personalization operations with a conversational interface related to an analysis of the lexical personality of an input, where the responsive output is provided with an output lexical personality based on the input lexical personality.

DETAILED DESCRIPTION

Figure 1:
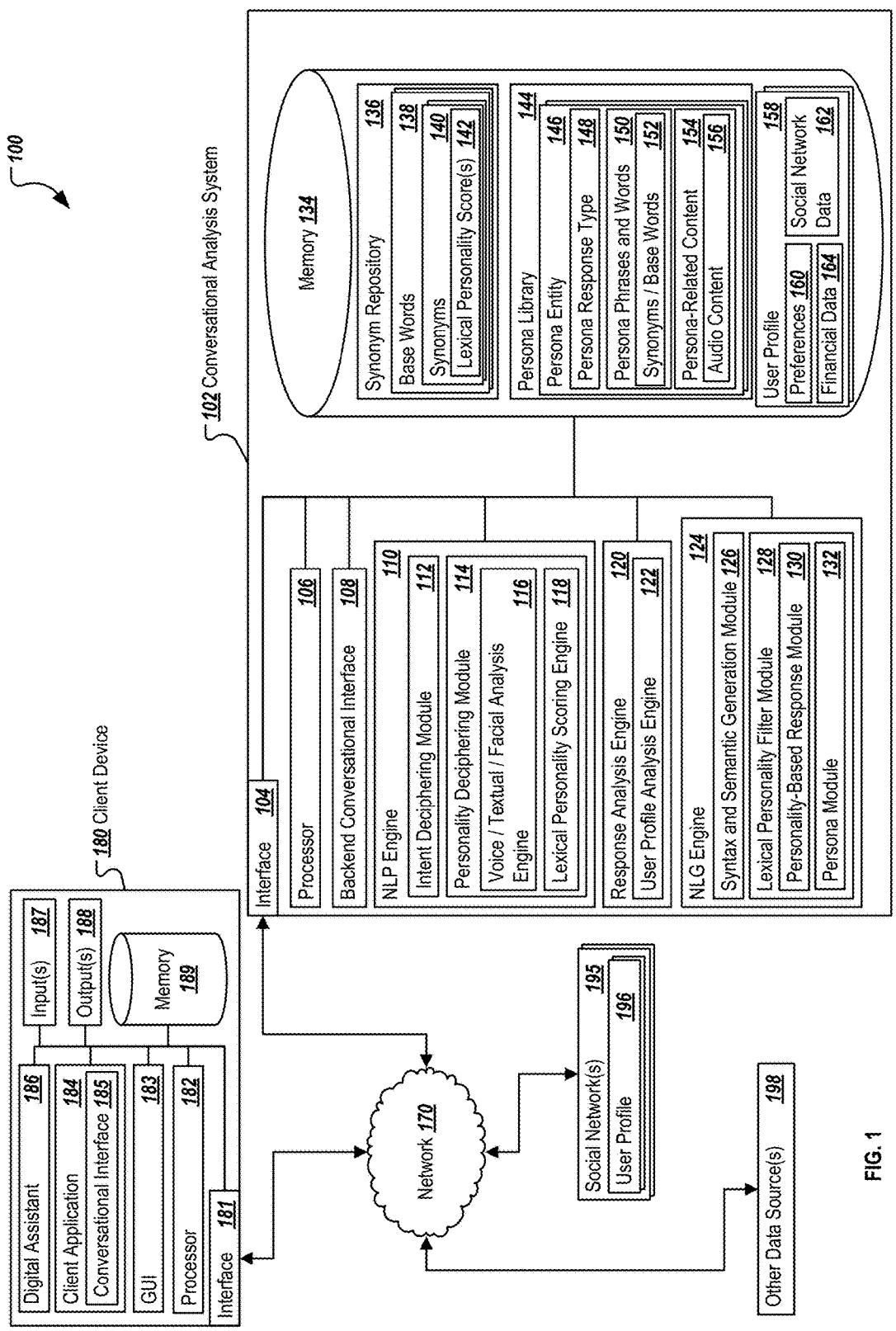
FIG. 1 is a block diagram illustrating an example system for personalizing interactions with a conversational interface.

The present disclosure describes various tools and techniques associated with personalizing a responsive output generated by a conversational interface based on a personality of the received input to which the output is responsive. Conversational interfaces allow users to interact with a virtual person or system that can interpret an intent associated with input provided by the user and determine a suitable response.

When building a conversational interface, the personality is an important aspect of the design. Generally, building rapport with individuals is a difficult task, but one that can improve the level of engagement and responsive action that the conversational interface may elicit from a user, and can consequently improve the trust that the user may have with such an interface, as well as with the entity or organization associated with the interface. A difficulty of current conversational interfaces is that most are associated with a single personality. In using a single personality for all types of feedback, such conversational interfaces fail to provide a dynamic and believable experience for users. The present disclosure describes several solutions for enhancing responsive content and dynamically adjusting the output of the conversational interface to match the lexical personality and/or preferences of the user. In doing so, the present solution enhances the conversational interface experience by transforming interactions into a realistic and dynamic experience.

In a first solution, and to enhance the interactions with the conversational interface, a method and system for identifying the personality of a conversational interface user based on measured characteristics of their conversational pattern is provided. The measured characteristics can include, but are not limited to, a particular formality, politeness, colloquial terminology, sarcasm, and emotional state of received input. Once the characteristics of the user's input are inferred from the conversational patterns of the user, those characteristics can be used in the natural language generation process to identify and apply a corresponding lexical output personality to be applied to a particular response prior to transmitting the response back to the user.

The detection and measuring of the input's characteristics can be quantified through a scoring mechanism to identify particular measured components of the input. For instance, a formality score and a politeness score can be quantified by a natural language processing engine associated with the conversational interface. Any suitable scoring and natural language processing techniques can be used to analyze and determine the measured characteristics, and any suitable individual characteristics can be measured.

Using any suitable component, engine, or method, an intent associated with the input can be determined. Once an intent of the input is determined, a set of responsive content can be identified, such as a particular basic phrase or set of information that is responsive to the received input. In traditional conversational interfaces, the initial response content would be provided to the user via the conversational interface. In this solution, however, the responsive content, may be mapped to one or more synonym words or phrases, where the various synonym words or phrases are associated with predetermined scores for one or more measures. In the current example, the initial response content may be associated with a first set of scores for both formality and politeness. The synonym words or phrases may have different sets of scores for formality and politeness. Based on the determined scores associated with the received input, one or more synonym words or phrases having the same meaning as portions, or tokens, of the initial response content can replace those corresponding portions based on the synonym words or phrases having a relative similar or matching scores as compared to the content of the received input. Once at least one synonym is used to replace at least a portion of the initial response content, the modified and personalized response can be output to the user through the conversational interface.

In a second solution, the received input and particular information about a user are considered to apply persona-specific modifications to a set of responsive content. Well-known celebrities each convey particular different personas that can affect the behavior of a user, including by providing or generating an additional level of trust for interactions. An example of such a persona could be Chef Gordon Ramsey, who may be associated with strict instructional feedback that is intended to cause a responsive action quickly. Another example of a different type of persona may be Oprah Winfrey, whose persona may be used in a more motherly manner to provide encouragement or kindly words to a user, particularly where a note of worry is present in the received input.

Similar to the first solution, the received input can be analyzed to identify a particular input personality type. In some instances, the input personality type can be determined based on a combination of various measurements determined from the analyzed input, including formality, politeness, regional terms or dialects, and other measurements. When the received input is associated with a voice input, other auditory factors can be considered, including a pitch of the voice, a length of the sounds, a loudness of the voice, a timber of the voice, as well as any other suitable factors. If the input is associated with video input, additional facial recognition features can be used to provide additional context to the input. In response to these measurements, the conversational interface can identify a particular input personality type associated with the received input.

The particular input personality type can then be mapped or connected to a persona response type (e.g., intellectual, philosophical, motherly, strong, etc.). Each persona may also be associated with at least one persona response type, such that a determination that a particular persona response type should be applied to an output may mean that two or more personas may be available. The present solution, however, can identify one or more social network-based actions, preferences, or other information about one or more social network accounts associated with the user interacting with the conversational interface. Using this social network information, the particular user's likes, interactions, and follows, among other relevant social media content and interactions, can be used to determine one or more available celebrities or entities with which the user has previously interacted. Based on this information, which can be stored in a user profile associated with the user or otherwise accessed in response to the conversational interface interaction, a particular persona available within the conversational interface and corresponding to the persona response type can be identified and used to modify the response. Any suitable modification can be used to modify and/or enhance the response content, such as including and/or substituting one or more common phrases and/or words associated with the persona in place of the initial response content. In some instances, the output may be presented to the user in the voice associated with the particular persona. In other instances, an image or video associated with the persona may be included with the response content.

Turning to the illustrated example implementation, FIG. 1 is a block diagram illustrating an example system 100 for personalizing interactions with a conversational interface. System 100 includes functionality and structure associated with receiving inputs from a client device 180 (associated with a user), analyzing the received input at the conversational analysis system 102 to identify an intent of the input and information on the personality or internal context of the input, identifying a response associated with the received input, and identifying at least one manner in which the identified response can be personalized before transmitting the response back to the client device 180. Specifically, the illustrated system 100 includes or is communicably coupled with a client device 180, a conversational analysis system 102, one or more social networks 195, one or more external data sources 198, and network 170. System 100 is a single example of a possible implementation, with alternatives, additions, and modifications possible for performing some or all of the described operations and functionality. Although shown separately, in some implementations, functionality of two or more systems, servers, or illustrated components may be provided by a single system or server. In some implementations, the functionality of one illustrated system or server may be provided by multiple systems, servers, or computing devices, including those physically or logically local or remote to each other. Any combination or permutation of systems may perform the functionality described herein. In some instances, particular operations and functionality described herein may be executed at either the client device 180, the conversational analysis system 102, or at one or more other non-illustrated components, as well as at a combination thereof.

As used in the present disclosure, the term "computer" is intended to encompass any suitable processing device. For example, client device 180 and the conversational analysis system 102 may be any computer or processing device (or combination of devices) such as, for example, a blade server, general-purpose personal computer (PC), Mac®, workstation, UNIX-based workstation, embedded system or any other suitable device. Moreover, although FIG. 1 illustrates particular components as a single element, those components may be implemented using a single system or more than those illustrated, as well as computers other than servers, including a server pool or variations that include distributed computing. In other words, the present disclosure contemplates computers other than general-purpose computers, as well as computers without conventional operating systems. Client device 180 may be any system which can request data, execute an application (e.g., client application 184), and/or interact with the conversational analysis system 102 and the conversational interface 108. The client device 180, in some instances, may be any other suitable device, including a mobile device, such as a smartphone, a tablet computing device, a smartwatch, a laptop/notebook computer, a connected device, or any other suitable device. Additionally, the client device 180 may be a desktop or workstation, server, or any other suitable device. Similarly, the conversational analysis system 102 may be a server, a set of servers, a cloud-based application or system, or any other suitable system. In some instances, the client device 180 may execute on or be associated with a system executing the conversational analysis system 102. In general, each illustrated component may be adapted to execute any suitable operating system, including Linux, UNIX, Windows, Mac OS®, Java™, Android™, Windows Phone OS, or iOS™, among others.

The conversational analysis system 102 can perform functionality associated with one or more backend conversational interfaces 108, and can perform operations associated with receiving input from a client device 180 (e.g., via conversational interface 185) associated with the backend conversational interface 108, and can analyze the received input to determine an intent of the input (e.g., a particular question, query, comment, or other communication to which a response may be generated for the conversational interface 108) and a personality associated with the input. Based on the determined intent, the conversational analysis system 102 can generate a corresponding response or response content to be provided back to the client device 180. Using a natural language generation engine 124, the conversational analysis system 102 can generate an appropriate initial response. Based on the personality associated with the input, the conversational analysis system 102 can identify or determine at least one personalization to be performed on the initial response to be provided to the client device 180, where applying the at least one personalization causes the initial response to be transformed into a personalized response transmitted to the client device 180 in response to the received input.

As described, two different types of personalizations are possible with the described system. In a first solution, the personality of the input can be assigned one or more scores associated with various measures of the input, such as politeness and formality, among others. Based on the determined score, the response content identified by the system 102 can be modified to include or be associated with similar or related characteristics as those of the received input. As an example, a relatively informal input but with a relatively high level of politeness can cause the system to modify at least some of the response content with synonyms having matching levels of informality and politeness. In this way, the lexical personality of the response matches that of the received input.

In the second solution, the intent and personality of the received input is determined, where the input is associated with a particular user profile. A set of responsive content associated with the determined intent of the input is identified, as well as a persona response type that is based on the personality or state identified from the input. A set of social network activity information associated with the particular user profile can be identified, where the social network activity information includes persons, entities, and things which the particular user profile likes, follows, or has interacted with within at least one of the social networks. Based on that information, a particular persona that matches or corresponds to the persona response type and the social network activity information can be identified from a persona library. The particular persona can be associated with at least one persona-related content, where that content is used to modify at least a portion of the set of responsive content. Once the persona-specific response is generated it can be transmitted back to the client device 180 responsive to the received input.

As illustrated, the conversational analysis system 102 includes an interface 104, a processor 106, a backend conversational interface 108, a natural language processing (NLP) engine 110, a response analysis engine 120, a natural language generation (NLG) engine 124, and memory 134. Different implementations may include additional or alterative components, with FIG. 1 meant to be an example illustration of one possible implementation. While illustrated separate from one another, at least some of these components, in particular the backend conversational interface 108, the NLP engine 110, the response analysis engine 120, and the NLG engine 124 may be combined within a single component or system, or may be implemented separate from one another, including at different systems and/or at remote components.

Interface 104 is used by the conversational analysis system 102 for communicating with other systems in a distributed environment—including within the environment 100—connected to the conversational analysis system 102 and/or network 170, e.g., client device 180, social network 195, and/or any other external data sources 198, as well as other systems or components communicably coupled to the network 170. Generally, the interface 104 comprises logic encoded in software and/or hardware in a suitable combination and operable to communicate with the network 170 and other communicably coupled components. More specifically, the interface 104 may comprise software supporting one or more communication protocols associated with communications such that the conversational analysis system 102, network 170, and/or interface's hardware is operable to communicate physical signals within and outside of the illustrated environment 100.

Network 170 facilitates wireless or wireline communications between the components of the environment 100 (e.g., between combinations of the conversational analysis system 102, client device(s) 180, and/or the other components, among others) as well as with any other local or remote computer, such as additional mobile devices, clients, servers, remotely executed or located portions of a particular component, or other devices communicably coupled to network 170, including those not illustrated in FIG. 1. In the illustrated environment, the network 170 is depicted as a single network, but may be comprised of more than one network without departing from the scope of this disclosure, so long as at least a portion of the network 170 may facilitate communications between senders and recipients. In some instances, one or more of the illustrated components (e.g., the conversational analysis system 102) or portions thereof (e.g., the NLP engine 110, the response analysis engine 120, the NLG engine 124, or other portions) may be included within network 170 as one or more cloud-based services or operations. The network 170 may be all or a portion of an enterprise or secured network, while in another instance, at least a portion of the network 170 may represent a connection to the Internet. In some instances, a portion of the network 170 may be a virtual private network (VPN) or an Intranet. Further, all or a portion of the network 170 can comprise either a wireline or wireless link. Example wireless links may include 802.11a/b/g/n/ac, 802.20, WiMax, LTE, and/or any other appropriate wireless link. In other words, the network 170 encompasses any internal or external network, networks, sub-network, or combination thereof operable to facilitate communications between various computing components inside and outside the illustrated environment 100. The network 170 may communicate, for example, Internet Protocol (IP) packets, Frame Relay frames, Asynchronous Transfer Mode (ATM) cells, voice, video, data, and other suitable information between network addresses. The network 170 may also include one or more local area networks (LANs), radio access networks (RANs), metropolitan area networks (MANs), wide area networks (WANs), all or a portion of the Internet, and/or any other communication system or systems at one or more locations.

The conversational analysis system 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the conversational analysis system 102, in particular those related to executing the various modules illustrated therein and their related functionality. Specifically, the processor 106 executes the algorithms and operations described in the illustrated figures, as well as the various software modules and functionalities, including the functionality for sending communications to and receiving transmissions from the client device 180 and the social network(s) 195, as well as to process and prepare responses to received input associated with the conversational interface 108. Each processor 106 may have a single core or multiple cores, with each core available to host and execute an individual processing thread.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, Objective-C, JavaScript, Java™, Visual Basic, assembler, Perl®, Swift, HTML5, any suitable version of 4GL, as well as others.

As illustrated, the conversational analysis system 102 includes, is associated with, and/or executes the backend conversational interface 108. The backend conversational interface 108 may be a program, module, component, agent, or any other software component which manages and conducts conversations and interactions via auditory or textual methods, and which may be used to simulate how a human would behave as a conversational partner. In some instances, the backend conversational interface 108 may be executed remotely from the conversational analysis system 102, where the analysis system 102 performs operations associated with determining and modifying the personality of certain inputs and responses, but where the conversational interface 108 determines the intent of the response and/or the responses to be provided. The backend conversational interface 108 may be accessed via a website, a web service interaction, a particular application (e.g., client application 184), or it may be a backend portion of a digital or virtual assistant application or functionality of a particular operating system, such as Apple's Siri, Google's Assistant, Amazon's Alexa, Microsoft's Cortana, or others. In some instances, a remote agent or client-side portion of the conversational interface 185 may execute at the client device 180, where inputs can be provided and responses presented to the user of the client device 180, while some or all of the processing is performed at the conversational analysis system 102 and the backend conversational interface 108.

The NLP engine 110 represents any suitable natural language processing engine, and performs operations related to understanding a set of received input received at the backend conversational interface 108. Examples of NLP engines that could be used or implemented include a plurality of web services and backend applications, including IBM's Watson, Google Cloud Natural Language API, Amazon Lex, Microsoft Cognitive Services, as well as any proprietary solution, application, or service. The processing performed by the NLP engine 110 can include identifying an intent associated with the input received via the conversational interface 108, which is performed by the intent deciphering module 112. The result of the intent determination can be a set of lexical semantics of the received input, which can then be provided to the response analysis engine 120, where at least an initial set of response content can be generated.

As illustrated, the NLP engine 110 further includes a personality deciphering module 114, where the personality deciphering module 114 can perform one or more operations to identify a particular personality of the received input. Any suitable algorithms can be used to determine the personality of the input. In some instances, scores for multiple measures of the input can be generated, including scores related to a formality of the input, a politeness of the input, usage of particular regional phrases, an accent or particular phrasing associated with the input, a level of sarcasm within the input, an emotional state associated with the input, as well as any other suitable measures or values. The personality deciphering module 114 may use, in particular, a lexical personality scoring engine 118 to generate the scores based on one or more rule sets and analysis factors. In some instances, an analysis engine 116 may be used to analyze the type of input received. The analysis engine 116 may be able to analyze and assist in the evaluation and scoring of textual input, auditory input, video or still image input (e.g., associated with a facial analysis or with a read of the eyes). For example, textual input may be analyzed to identify a score or evaluation of a textual tone or syntax, the politeness and formality of the syntax, a level of sarcasm, and particular vocabulary used. An auditory input, which can include the voice of a user associated with the received input, can be analyzed to further obtain information on a pitch of the voice, a length of sounds, a loudness of the voice, a timber of the voice, any shakiness or quavering of the voice, as well as other measures. If a video or image of the user associated with the input is available, such as from a camera associated with the client device 180, facial analysis techniques and body language-related analyses can be used to determine particular stress, upsetness, and other emotionally-related measures. Based on these analyses, one or more scores or evaluations associated with the personality of the input can be obtained or generated.

In some instances, based on a combination of the scores, a personality input type can be identified or determined. The personality input types can be associated with predetermined values or ranges of values for different measure combinations. Example personality input types may include "scared," "calm, inquisitive," "calm, instructional," "angry," and "angry, unsure," among others. In some instances, the lexical personality scoring engine 118 can, in addition to analyzing and determining scores or evaluations of the different available measures, can identify and assign a particular personality input type to the current received input. In some instances, the lexical personality scoring engine 118, or another component, can also map or identify a particular persona response type to the personality input type, where the persona response types identify a type of persona to be associated with and to be used in modifying a set of response content as described herein. The persona response types can include any suitable categories, including, for example, "intellectual," "philosophical," "motherly," and "strong," among others. In some instances, the persona response type may also be determined, at least in part, on a particular action that the conversational interface 108 and the response analysis engine 120 determine that the user should be recommended into performing. For example, in a financial-related conversational interface 108, a question about a particular transaction for a user may be determined as the intent of the received input. In response to processing the response in light of a particular user's accounts or financial situation, a determination may be made by the response analysis engine 120 to encourage the user not to continue with the transaction. In those instances, the particular persona response type used to enhance the response may be a harsher or stricter persona response type. For instance, instead of choosing a motherly persona response type, a stricter or stronger persona response type can be used to emphasize a recommendation not to complete the transaction.

As mentioned, the determined intent of the received input can be provided to a response analysis engine 120, where the response analysis engine 120 determines a particular ideal response or response sentiment that should be used as a basis for the response. In some instances, where the determined intent of the received input is a question, the response analysis engine 120 may be used to derive a responsive answer to the question. The answer may be a particular value or query response, and can be provided to the NLG engine 124 for further processing and generation of a sentence or other detailed response to be provided via the conversational interface 108. The response analysis engine 120 may be any suitable component or system capable of generating a response to the determined intent of the received intent. In some instances, the response analysis engine 120 may be associated with a search engine, an expert system, a knowledge base, or any other suitable backend component able to respond to the input.

In some instances, the response analysis engine 120 can include a user profile analysis engine 122, where additional information about a particular user profile associated with the received input can be obtained. The user profile analysis engine 122 can be used to provide a user-specific response, and can use information associated with a particular user profile within a plurality of user profiles 158. In some instances, the user profile 158 can identify a set of preferences 160 previously defined by the user or determined based on previous interactions and other user operations. As illustrated, social network data 162 may be included or associated with the user profile 158. In some instances, the social network data 162 may identify particular social network profiles and/or login credentials associated with one or more social networks 195. The user profile analysis engine 122 can use that information to access a particular social network 195 (e.g., Facebook, Twitter, Reddit, Instagram, etc.) and obtain information about particular social network activities of the user, including particular persons, entities, and other accounts with which the user follows, likes, or otherwise has interacted with as defined by a social network user profile 196, where that information identifies particular public personalities or entities with which later persona-based content and enhancements can be used. In some instances, at least some of the information may be available within the social network data 162 without requiring the user profile analysis engine 122 or another component to access the social networks 195 at the time of the interaction with the conversational interface 108, instead accessing the relevant social network data. Further, the user profile 158 may store financial data 164 associated with the user profile 158, including transaction histories, current account information, and other similar data. In some instances, information to access such information may be stored in the financial data 164, and the user profile analysis engine 122 can use that data to access the accounts or other relevant data in real-time during the interactions with the interface 108. In some instances, location information associated with the user may be included in the user profile 158, or may be accessible via the client device 180 or other means. The location information can be used to personalize responses, and to include that information as part of the response analysis.

The NLG engine 124 can receive the output of the response analysis engine 120 and prepare a natural language response to the received input based on that output. The NLG engine 124 can be any suitable NLG engine capable of generating natural language responses from the output of the response analysis engine 120. In some instances, the NLG engine 124 can identify or otherwise determine at least a base set of words, phrases, or other combinations or tokens to be used in representing the response content received from the response analysis engine 120. The base set of words, phrases, or tokens are associated with an initial response determined by the response analysis engine 120, and may be an initial representation of the natural language result. The syntax and semantic generation module 126 can perform these operations, and can make decisions on how to place the concept of the response received from the response analysis system 120 into a natural language set of words, phrases, or combination of tokens.

Once the initial set of response content is available, the lexical personality filter module 128 can be used to determine and apply the appropriate modifications to the response content to be used to generate a personalized response. As noted, the personalized response can be generated by identifying one or more synonyms (e.g., from the synonym repository 136) of the base words, phrases, or combinations of tokens included in the initial response and replacing one or more of those base portions with synonyms having a matching or similar set of characteristics as those determined to be associated with received input using a personality-based response module 130. The personality-based response module 130 can use a synonym repository 136 to identify entries associated with particular base words (or tokens) 138. Each of the base words 138 may be associated with a plurality of synonyms 140, where each synonym 140 is associated with a set of one or more predefined lexical personality scores 142. Those scores 142 can be compared to the scores associated with the received input as determined in the lexical personality scoring engine 118, and one or more of the synonyms 140 identified as appropriate for substitution based on their match. The lexical personality filter module 128 can then modify the initial response content by replacing the base words 138 with the at least one identified synonyms 140.

The lexical personality filter module 128 can also include and use a persona module 132 to apply a particular persona to a set of response content. The persona module 132 can access a persona library 144 storing one or more persona entities 146. The persona entities 146 can be associated with celebrities and other well-known persons, where each entity 146 is associated with one or more persona response types 148. The persona response types 148 can be matched or associated with the persona response type determined by the personality deciphering module 114 to identify which persona entities 146 to associate with a particular response. Importantly, the described process can use the social network data 162 associated with a particular user profile 158 to determine a subset of persona entities 146 to consider for application to a particular response based on those likes, follows, or other interactions performed by the user. From that subset of persona entities 146, one or more persona entities 146 that match the persona response type can be identified, and a best or preferred persona can be determined.

Each persona entity 146 can be associated with a set of persona phrases and words 150 and/or a set of persona-related content 154. The set of persona phrases and words 150 may be well-known phrases or language used by the celebrity or other person in the real world, such that those phrases or language can be used in responses. In some instances, those phrases and words 150 can be associated with one or more synonyms or base words 152, where the base words 152 can be used to identify relevant phrases and words 150 to be used. Modifying the initial set of response content can include replacing one or more base words or tokens with those well-known words or phrases. Alternatively, the modification can include supplementing or adding some of those well-known words or phrases alongside the initial response content, sometimes without substituting any of the initial phrases. In some instances, the persona phrases and words 150 may be associated with one or more lexical personality scores, such that those persona phrases and words 150 that correspond to the input personality score can be used, combining the two solutions.

The set of persona-related content 154 can include additional non-phrase or word content that can be used to personalize a response or conversational interface 108 with the identified persona. In some instances, such content 154 can include images, video, or other media associated with the persona entity 146, where that content 154 can be presented along with a generated response. As illustrated, the content 154 may include audio content 156 in the voice of the person associated with the persona entity 146, such that at least a portion of the response transmitted to the client device 180 can be provided in the same voice of the persona. Other unique or defining aspects of the particular persona can be included in the persona-related content 154 and used to embellish or personalize the response.

As illustrated, the conversational analysis system 102 includes memory 134. In some implementations, the conversational analysis system 102 includes a single memory or multiple memories. The memory 134 may include any type of memory or database module and may take the form of volatile and/or non-volatile memory including, without limitation, magnetic media, optical media, random access memory (RAM), read-only memory (ROM), removable media, or any other suitable local or remote memory component. The memory 134 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the conversational analysis system 102. Additionally, the memory 134 may store any other appropriate data, such as VPN applications, firmware logs and policies, firewall policies, a security or access log, print or other reporting files, as well as others. As illustrated, memory 134 includes, for example, the synonym repository 136, the persona library 144, and the user profiles 158, described herein. Memory 134 may be local to or remote to the conversational analysis system 102, and may be available remotely via network 170 or an alternative connection in such instances where not locally available. Further, some or all of the data included in memory 134 in FIG. 1 may be located outside of the conversational analysis system 102, including within network 170 as cloud-based storage and data.

Illustrated system 100 includes at least one client device 180, and may include a plurality of client devices 180 in some instances. Each client device 180 may generally be any computing device operable to connect to or communicate within the system 100 via the network 170 using a wireline or wireless connection. In general, the client device 180 comprises an electronic computer device operable to receive, transmit, process, and store any appropriate data associated with the system 100 of FIG. 1. As illustrated, the client device 180 can include one or more client applications, including the client application 184 and a digital assistant 186. In some instances, the digital assistant 186 may be a part of the operating system executing on the client device 180, or may be a standalone application or client-side agent of a backend application. In some instances, the client device 180 may comprise a device that includes one or more input devices 187, such as a keypad, touch screen, camera, or other device(s) that can interact with the client application 184 and/or digital assistant 186 and other functionality, and one or more output devices 188 that convey information associated with the operation of the applications and their application windows to the user of the client device 180. The output devices 188 can include a display, speakers, or any other suitable output component. The information presented by the output devices 188 can include digital data, visual information, auditory output, or a graphical user interface (GUI) 183, as shown with respect to the client device 180. In general, client device 180 comprises an electronic computer device operable to receive, transmit, process, and store any appropriate data associated with the environment 100 of FIG. 1.

Client application 184 can be any type of application that allows the client device 180 to request and view content on the client device 180. In some instances, client application 184 may correspond with one or more backend applications or functionality, including an application or platform associated with the conversational analysis system 102. In some instances, the client application 184 can be associated with a client-side version of the conversational interface 185, where the client-side version of the conversational interface 185 can represent a means for users to provide inputs to the conversational interface 108 and receive the personalized output of the same for viewing at the client device 180.

In many instances, the client device 180 may be a mobile device, including but not limited to, a smartphone, a tablet computing device, a laptop/notebook computer, a smartwatch, or any other suitable device capable of interacting with the conversational analysis system 102 and the conversational interface 108. One or more additional client applications 184 may be present on a client device 180, and can provide varying functionality for users. In some instances, client application 184 may be a web browser, mobile application, cloud-based application, or dedicated remote application or software capable of interacting with at least some of the illustrated systems via network 170 to request information from and/or respond to one or more of those systems.

The digital assistant 186 may be any interactive artificial or virtual intelligence component, agent, or other functionality that can be interacted with by a user, either textually or verbally through one or more input components 187 (e.g., a microphone), manually through one or more input components 187 (e.g., physical or virtual keyboards, touch screen buttons or controls, other physical or virtual buttons, etc.), or through captured gestures or movements identified by the client device 180. In general, the digital assistant 186 may be a software agent, module, or component, among others, that can perform tasks or services for an individual in response to one or more inputs, and can include or represent a particular conversational interface associated with the backend conversational interface 108. As indicated, any one of numerous commercial examples may be used, as well as other proprietary or application-specific assistants. The digital assistant 186 may work and interact via text (e.g., chat), voice, image submission, or other suitable inputs. Some virtual assistants can interpret input using natural language processing (NLP) to match user text or voice input to executable commands. In some instances, the digital assistant 186 can be interacted with to initiate and perform one or more input and response interactions described herein. In some instances, the digital assistant 186 may be a standalone application (e.g., Google Assistant executing on an iPhone), functionality included in a particular application used for other purposes (e.g., an Alexa-enabled Amazon app), or an agent or other functionality built into the operating system (e.g., Siri on Apple's iOS).

As illustrated, the client device 180 may also include an interface 181 for communication (similar to or different from interface 104), a processor 182 (similar to or different from processor 106), memory 189 (similar to or different from memory 134), and GUI 183. GUI 183 can interface with at least a portion of the environment 100 for any suitable purpose, including generating a visual representation of the client application 184 and/or the digital assistant 186, presenting a pop-up or push notification or preview thereof, presenting the UI associated with the conversational interface 185, or any other suitable presentation of information. GUI 183 may also be used to view and interact with various Web pages, applications, and Web services located local or external to the client device 180, as well as information relevant to the client application 184. Generally, the GUI 183 provides the user with an efficient and user-friendly presentation of data provided by or communicated within the system. The GUI 183 may comprise a plurality of customizable frames or views having interactive fields, pull-down lists, and buttons operated by the user. For example, the GUI 183 may provide interactive elements that allow a user to view or interact with information related to the operations of processes associated with the conversational analysis system 102 and any associated systems, among others. In general, the GUI 183 is often configurable, supports a combination of tables and graphs (bar, line, pie, status dials, etc.), and is able to build real-time portals, application windows, and presentations. Therefore, the GUI 183 contemplates any suitable graphical user interface, such as a combination of a generic web browser, a web-enabled application, intelligent engine, and command line interface (CLI) that processes information in the platform and efficiently presents the results to the user visually.

The external data sources 198 illustrated in FIG. 1 may be any other data source that provides additional information to the conversational analysis system 102. The information may be used by the response analysis engine 120 to determine a particular response to the received input, or the information may be used to personalize the response as described herein. Any number of data sources 198 may be used in alternative implementations.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2A:
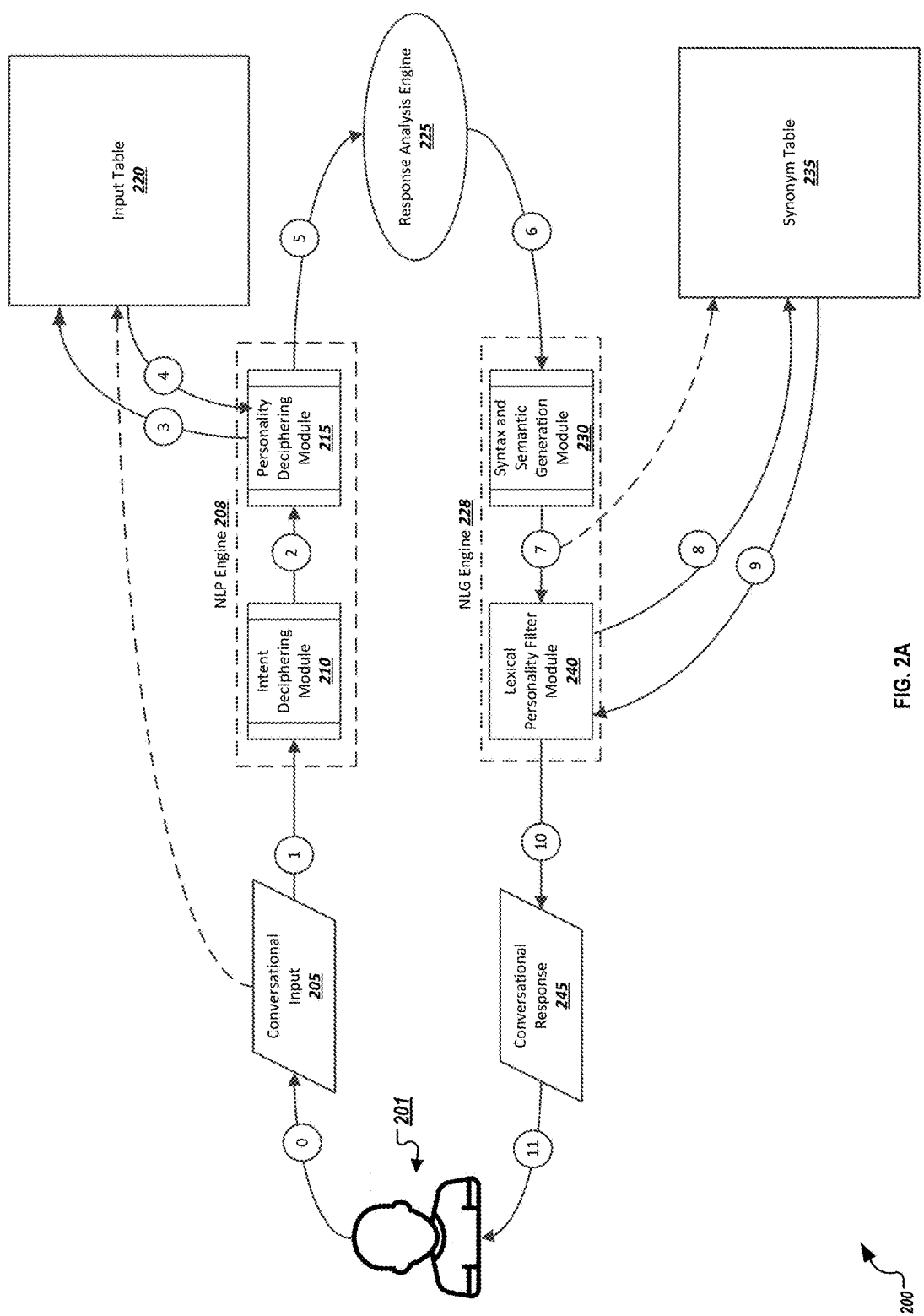

FIGS. 2A and 2B combine to represent an illustration of a data and control flow of example components and interactions 200 performed by a system performing personalization operations with a conversational interface related to an analysis of the lexical personality of an input, where the responsive output is provided with an output lexical personality based on the input lexical personality. The diagram provides an example set of operations and interactions to identify the personality with the received input and to prepare and provide a personalized response with the same or similar personality. Illustrated in FIG. 2A-2B are a user 201 interacting with a conversational interface (or client device at which a user is interacting with the conversational interface), an NLP engine 208 (including an intent deciphering module 210 and a personality deciphering module 215), a response analysis engine 225, and an NLG engine 228. These components may be similar to or different the components described in FIG. 1.

As illustrated, the user 201 provides a conversational or user input 205 to the NLP engine 208. The NLP engine 208 determines both an intent of the conversational input 205 (using the intent deciphering module 210) and a determination of a lexical personality score or rating associated with the content of the conversational input 205 (using the personality deciphering module 215). In some instances, the determination of the intent and the determination of the lexical personality score may be separate activities or actions. In other instances, however, the determined intent may impact or otherwise affect the determination of the lexical personality score, while the lexical personality score may also impact a determination of intent. The intent can represent the question, query, or information associated with the conversational input 205, and can be determined using any suitable method. In some instances, a natural language understanding (NLU) engine may be used to understand the intent, which is what the conversational input 205 wants, is asking about, or otherwise relates to. The intent of the conversational input 205 is then used to determine a suitable response.

The personality deciphering module 215 can evaluate the particular conversational input 205 using one or more measures, where each measure is graded on a suitable scale. As illustrated in input table 220 (expanding in FIG. 2B), example measures can include a level of formality and a level of politeness associated with the conversational input 205. The personality deciphering module 215 can generate scores associated with the analysis. As illustrated, the input table 220 shows a plurality of potential conversational inputs of differing levels of formality and politeness. In this example, the conversational input 205 can be represented by sentence 221, which recites "My bad, I can't find it, please help me out and I'll owe you one." Based on analysis of the vocabulary and syntax used within the sentence, a formality score of 0.1 (on a scale from 0 to 1) and a politeness score of 0.95 (on a scale of 0 to 1) are generated. Input table 220 illustrates formality and politeness scores associated with other sentences having the same intent, and shows how various inputs can be scored. Based on the scoring analysis, the determined lexical personality score(s) are associated with the conversational input 205.

The NLP engine 208 provides its outputs of the determined intent and the lexical personality score(s) to the response analysis engine 225. The engine 225 uses this information to determine a suitable response to the conversational input 205 based on the intent. In some instances, the lexical personality score(s) may be provided to the lexical personality filter module 240 for later use, as the engine 225 may or may not use or apply the score(s) to determine the suitable response.

Once the essence or general substance of the response is determined, the response analysis engine 225 provides that information to the NLG engine 228, where the NLG engine 228 is used to prepare the conversational response based on the response essence or content identified by the response analysis engine 225. As illustrated, the NLG engine 228 includes a syntax and semantic generation module 230 and the lexical personality filter module 240. The syntax and semantic generation module 230 can be used to generate at least a base set of tokens (236 as illustrated in FIG. 2B) as an initial natural language response to the conversational input 205. The tokens may each represent a single word or phrase associated with an initial response. For example, several tokens may be generated in response to the example input above, and may indicate that based on the determined intent, the set of tokens may include "I will" "help" "you find it, [Sir or Miss]."

Once the initial response is determined, the lexical personality filter module 240 can be used to determine at least one personalization to be made to the initial response tokens based on the prior determination of the lexical personality scores. The lexical personality filter module 240, for instance, can identify a set of synonyms for at least some of the tokens included in the base words 236. In some instances, synonyms may be identified for particular tokens, while in other instances, synonyms may be identified for the entire sentence or response. As illustrated in synonym table 235, each, or at least some, of the base token or word can be associated with one or more synonyms or synonym tokens. Each synonym or synonym token may be associated with a corresponding lexical personality score. As illustrated in synonym table 235, a similar scoring methodology can be used for the synonyms as the conversational input 205 in the input table 220. Based on the determined scores for the conversational input 205, one or more synonym tokens can be identified as having similar lexical personality scores. In the illustrated example, the second set of synonyms 237 are associated with a formality score of 0.1 and a politeness score of 0.9, relatively similar to the scores of the conversational input 205 determined at the NLP engine 208 (i.e., 0.1 For formality and 0.95 for politeness). Therefore, that set of synonyms 237 can be identified as the appropriate modification for a personalized response. In some instances, each individual synonym token may be associated with lexical personality scores, such that the identification of synonyms is done on a base token by base token basis. In some instances, such as where several synonym tokens are associated with similar lexical personality scores, two or more synonym tokens associated with different scores may be used in personalizing a particular response. For example, if the politeness score of the conversational input 205 was 0.8, some of the synonyms in the second set of synonyms 237 may be used as well as some of the synonyms in the third set of synonyms 238.

Once the suitable synonyms matching the personality of the conversational input 205 are identified, the NLG engine 228 can replace at least one token from the initial token set with the at least one suitable synonym. In some instances, only one of the initial tokens may be replaced or substituted with a synonym token, while in others multiple tokens or the entire set of tokens may be replaced. The modified response represents a conversational response 245 from the NLG engine 228, which can then be transmitted back to the user 201 (or the client device associated with user 201).

Figure 3:
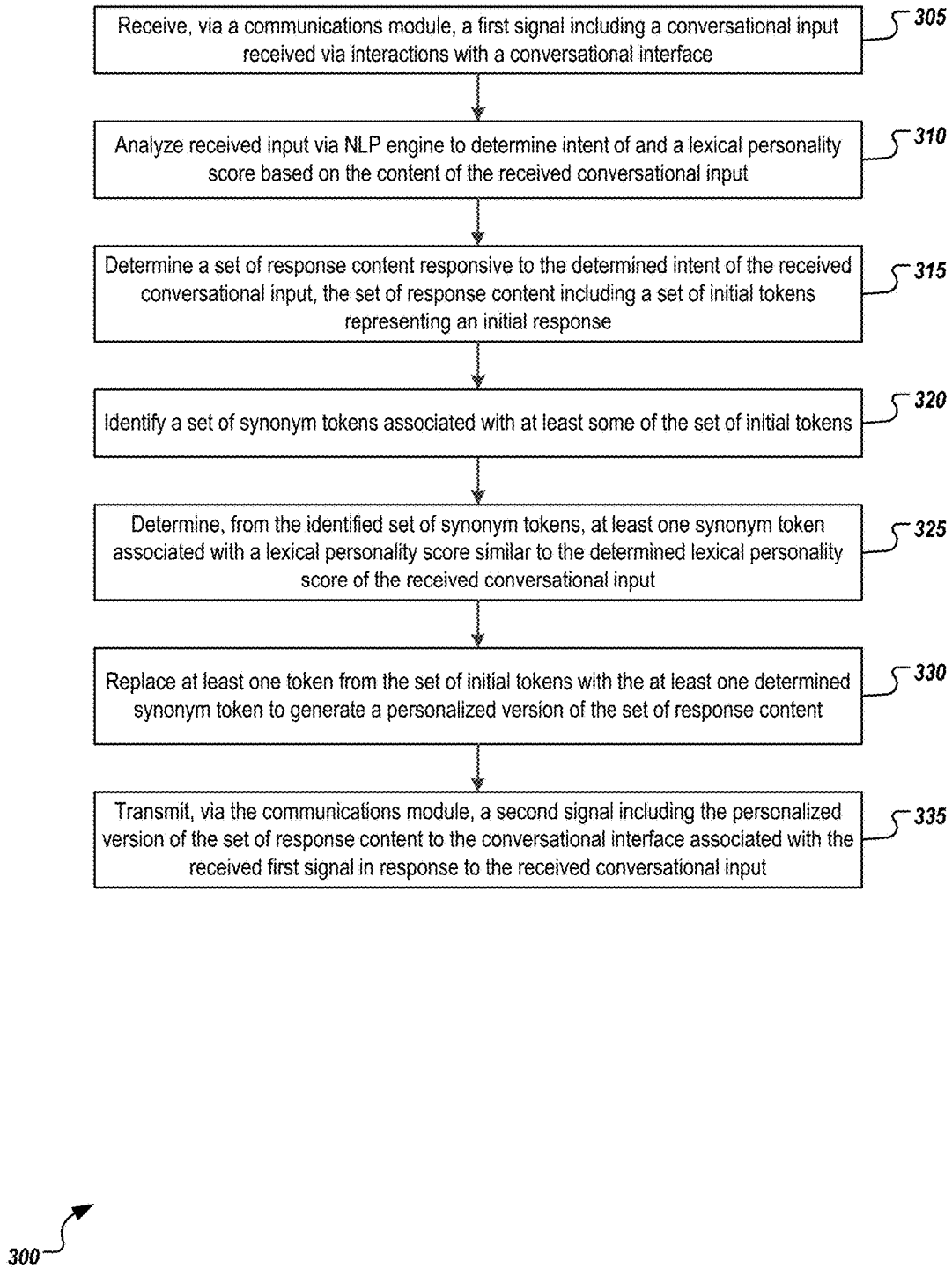
FIG. 3 is a flow chart of an example method performed at a system associated with a conversational interface to identify a first lexical personality of an input and provide a response to the input applying a second lexical personality based on the identified first lexical personality.

FIG. 3 is a flow chart of an example method 300 performed at a system associated with a conversational interface to identify a first lexical personality of an input and provide a response to the input by applying a second lexical personality based on the identified first lexical personality. It will be understood that method 300 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 300. In some implementations, the method 300 and related methods are executed by one or more components of the system 100 described above with respect to FIG. 1, or the components described in FIG. 2A-2B.

At 305, a first signal including a conversational input associated with interactions with a conversational interface are received via a communications module. In some instances, the first signal can include only the content of the conversational input, while in other instances the first signal may also include an identification of a particular user or user profile associated with the conversational input. In some instances, the conversational input may be received at a specific endpoint associated with a particular conversational interface or related application, such that the analysis of the conversational input is based on the use of the particular conversational interface or related application. Examples may include a digital assistant or a particular website, where the conversational input is to be responded to based on the information obtainable by or related to that particular interface or application.

In some instances, the conversational input may be or may include text-based input, auditory input (e.g., an audio file), and/or video or image input. The conversational input can be submitted by a user or agent associated with a particular user profile, although for purposes of some implementations of method 300, identification of the particular user profile is not needed to perform the personalization process. In some instances, the received conversational input can represent a particular query, question, or interactive communication.

At 310, the received conversational input is analyzed via a natural language processing engine or service to determine an intent associated with the input and a lexical personality score based on the content of the received input. The intent associated with the input can be determined based on any suitable factor, and can be used to determine a meaning of a particular request associated with the conversational input. The intent may be used to determine a particular response to be generated. The lexical personality score can be used to identify a personality of the conversational input, and to modify the corresponding conversational response in a personalized manner such that the lexical personality of the response corresponds to the lexical personality of the conversational input. Determining the lexical personality score can be based on any suitable analysis techniques, and can result in scores being applied to the conversational input based on one or more measures or factors. In one example, scores may be defined for formality and politeness for a particular input. Scores may also be determined for sarcasm detected in the input, particular predefined words such as curse words, words associated with particular moods (e.g., "angry", "mad"), particular regional words or phrases, as well as other scores. Where the conversational input is a spoken or verbal input, the voice of the speaker can also be analyzed to identify a particular accent, a mood detectable from the speech patterns, and other audible-related aspects. Scores for some or all of these measures may be associated with the conversational input.

At 315, a determination is made as to a set of response content responsive to the determined intent of the received conversational input. In some instances, the set of response content can include a set of initial tokens to be used in an initial or proposed response. In some instances, the set of initial tokens can represent an initial sentence or phrase responsive to the conversational input, where the initial sentence or phrase is associated with a default lexical personality (e.g., where formality and politeness are scored at 1 on a 0 to 1 value range).

Once the initial tokens are identified, at 320 a set of synonym tokens associated with at least some of the set of initial tokens can be identified. In some instances, a synonym repository may be accessed to identify synonyms associated with at least some of the initial tokens. The synonym tokens, which may represent single words or phrases corresponding to the initial token to which they are related, can be associated with at least one predetermined lexical personality score. In some instances, the predetermined lexical personality scores may be associated with measures that are evaluated and determined at 310. In other instances, at least some of the predetermined lexical personality scores may differ from the measures evaluated at 310.

At 325, at least one synonym token from the identified set of synonym tokens can be determined to be associated with a lexical personality score similar to the determined lexical personality score of the received conversational interface. In some instances, the scores may exactly match, while in others, the scores may be within a particular threshold or range near or within the other scores. Any suitable algorithm or comparison operation can be used to determine which synonym tokens are close enough to a match to the lexical personality scores of the initial tokens.

At 330, at least one token from the set of initial tokens can be replaced with at least one determined synonym token (at 325). By replacing the initial token with the synonym token, a personalized version of the set of response content is generated, such that a personalized conversational response can be provided back to the user.

At 335, a second signal including the personalized version of the set of response content is transmitted, via the communications module, to the conversational interface associated with the received first signal. In some instances, the personalized response may be modified to match or closely align with the lexical personality score of the conversational input initially received. In other instances, the lexical personality of the personalized response may differ from the lexical personality score of the received conversational input in a way that complements or otherwise corresponds to the personality of the received input.

Figure 4:
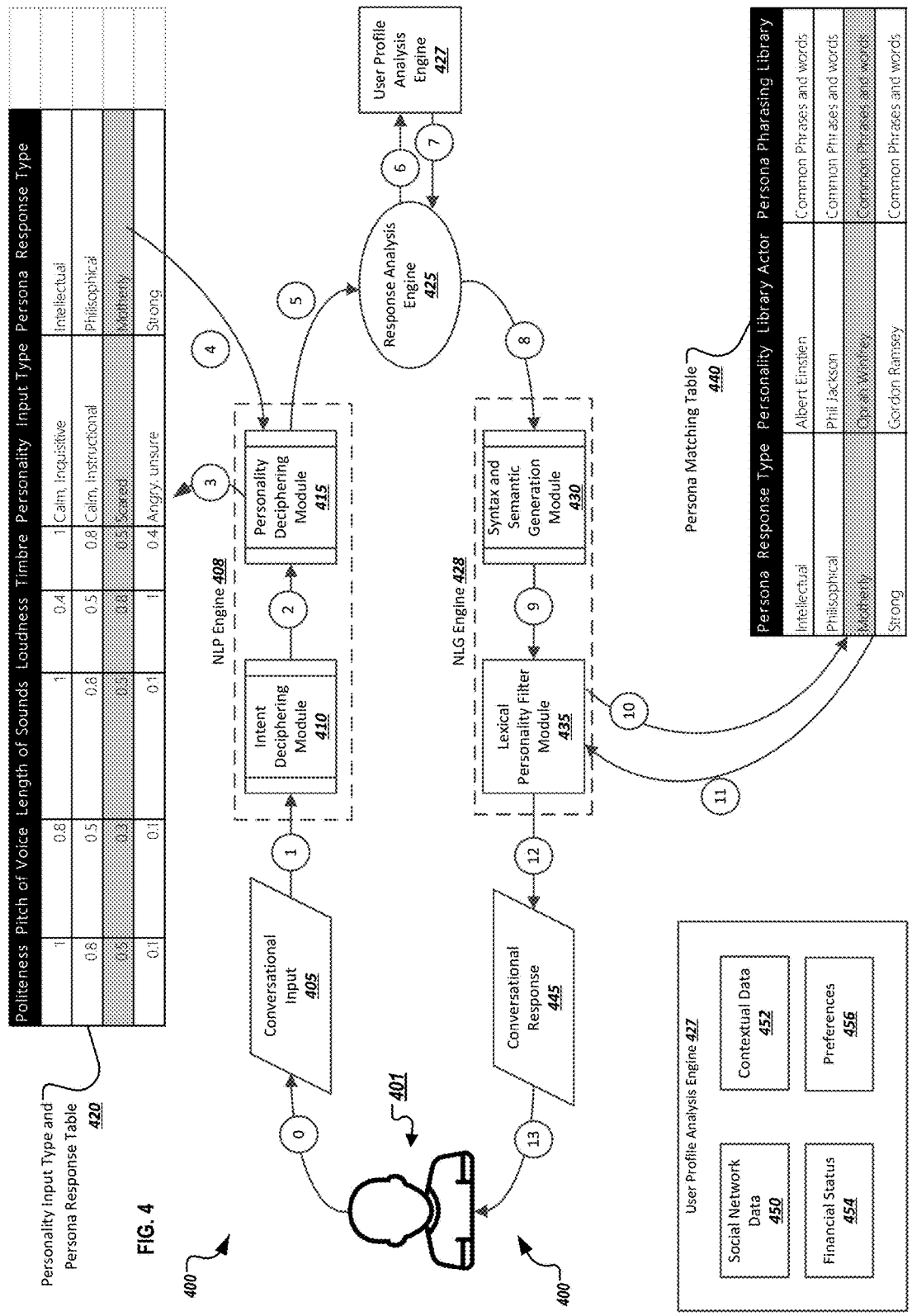
FIG. 4 is an illustration of a data and control flow of example interactions performed by a system performing persona-based personalization operations for a conversational interface based on an analysis of the lexical personality of an input and a corresponding user profile, generating a responsive output associated with the input, and modifying or transforming the responsive output to a persona-specific responsive output based on the corresponding user profile associated with the received input.

FIG. 4 is an illustration of a data and control flow of example interactions 400 performed by a system performing persona-based personalization operations for a conversational interface based on an analysis of the lexical personality of an input and a corresponding user profile, generating a responsive output associated with the input, and modifying or transforming the responsive output to a persona-specific responsive output based on the corresponding user profile associated with the received input. Illustrated in FIG. 4 are a user 401 interacting with a conversational interface (or client device at which a user is interacting with the conversational interface), an NLP engine 408 (including an intent deciphering module 410 and a personality deciphering module 415), a response analysis engine 425, and an NLG engine 428. These components may be similar to or different from the components described in FIG. 1, as well as those illustrated in FIG. 2A-2B.

As illustrated, the user 401 provides a conversational or user input 405 to the NLP engine 408. As previously described, the NLP engine 408 can determine an intent of the conversational input 405 (e.g., using the intent deciphering module 410). In this solution, the NLP engine 408 can also identify one or more lexical personality scores or ratings associated with the content of the conversational input 405 (using the personality deciphering module 415). Alternatively, or based on those scores, each received conversational input 405 can be evaluated to determine a particular personality input type. The personality input type can describe a mood, tone, or other aspect of the conversational input and the user 401. In some instances, a combination of the lexical personality scores can be used to identify the personality input type, while in others, the personality input type may be determined directly without the scores. In combination with the personality input type, a corresponding persona response type can be identified. As illustrated in the personality input type and persona response type table 420, tables of lexical score combinations can be considered by the personality deciphering module 415 to determine the personality input type and the corresponding persona response type. In some instances, the persona response type may be mapped to one or more different personality input types, which in some instances can be stored separate from the personality input type table 420 and the corresponding lexical personality scores. In the illustrated example, lexical personality scores are determined for a politeness level, a pitch of a voice, a length of the sounds used in the input, a loudness of the voice, and a timber of the voice used in the conversational input 405. Different scores, or a combination of different scores, can result in the association of the conversational input with different personality input types. The illustrated rows of the table 420 can represent only a portion of the possible score combinations and personality input types. In the illustrated example, a determination is made that the conversational input 405 corresponds to a "Scared" input personality type, such that a "Motherly" persona response type should be used, if available, to personalize the conversational response.

The NLP engine 408 provides its outputs of the determined intent and the lexical personality score(s) and persona response type determination to the response analysis engine 425. The response analysis engine 425 uses this information to determine a suitable response to the conversational input 405 based on the intent. In some instances, the lexical personality score(s) and the persona response type determination may be provided to the lexical personality filter module 435 for later use, as the response analysis engine 425 may or may not use or apply the score(s) and persona response type determination to determine the suitable response.

As illustrated, the response analysis engine 425 can further identify at least some additional response-relevant information associated with the user or user profile associated with the interactions with the conversational interface. As illustrated, the response analysis engine 425 can interact with a user profile analysis engine 427 to determine personalizations to be applied or additional contextual information that can be used in determining the appropriate response. The user profile analysis engine 427 can include various sets of data or information about the user, as well as information on how to access remotely located information associated with the user.

The user profile analysis engine 427 can access or obtain social network data 450 associated with the user profile. The information can include specific information about one or more entity, business, or celebrity accounts with which the user follows, likes, or "hearts", among other indications, on one or more social networks. In some instances, the information can also include, or can be used to derive, relatively positive or negative interactions or mentions associated with those accounts outside of explicit indications of liking or following, such as positive status updates or comments associated with those entities or persons. Based on this information, the user profile analysis engine 427 can identify one or more accounts associated with the user profile, which may be used or associated with at least one persona available in a persona library associated with the lexical personality filter module 435. This information can be shared with the lexical personality filter module 435 and used to personalize the output for the user.

The user profile analysis engine 427 can also obtain or determine contextual data 452 associated with the user, such as a current location or other similar information. The contextual data 452 can be considered in localizing or contextualizing the response content to the current status of the user. The user profile analysis engine 427 can also consider one or more defined or derived preferences 456 of the user profile. The preferences 456 may be used to affect or impact the response substance determined by the response analysis engine 425, as well as to determine or identify a particular persona to be applied to a response by the lexical personality filter module 435.

The user profile analysis engine 427 can identify a financial status 454 associated with the user profile, where the financial status 454 can be used to affect the response to be provided back to the user. For example, if the conversational input 405 relates to a financial transaction or a purchase, the financial status 454 can be used to update the response to be provided, such as by evaluating a recommendation or particular action to be taken. The result of the analysis in light of the financial status 454 can be used to determine the proper substance of the response.

Once the essence or substance of the response is determined, as well as any contextual data or user profile-related data, the response analysis engine 425 can provide that information to the NLG engine 428, where the NLG engine 428 is used to prepare the conversational response based on the response essence or content identified by the response analysis engine 425 and the persona response type identified by the NLP engine 408. As illustrated, the NLG engine 428 includes a syntax and semantic generation module 430 and the lexical personality filter module 435. The syntax and semantic generation module 430 can be used to generate an initial response to be provided in response to the conversational input 405. In some instances, a similar process to that described in FIGS. 2A-B can be used to identify particular tokens associated with the response, where the syntax and semantic generation module 430 generates those tokens based on the substance of the response identified by the response analysis engine 425.

Once the initial response is determined, the lexical personality filter module 435 can be used to determine at least one persona-specific personalization to be made to the initial response tokens based on a user profile-specific persona to be applied. As noted, the social network data 450 acquired by the user profile analysis engine 427 can be used and compared to the persona library to identify one or more persona entities that correspond to the social network activity of the user profile. In some instances, a persona response type as identified in the persona matching table 440 may be associated with two or more personas. For example, a Motherly persona response type illustrated in table 440 corresponds to "Oprah Winfrey." Other implementations may include additional options for the Motherly persona response type, such as "Julia Roberts" and "Emma Thompson". The user profile's associated social network data 450 can be used to identify a best match of those personas. That best match can be determined by a direct like or following of one of the personas, a like or following of a business or project associated with one of the personas, and/or a positive or negative reactions or interaction associated with one of the personas. By using the social network data, the lexical personality filter module 435 can identify a persona recognized and, hopefully, liked or trusted by the user profile.

Each particular persona, or personality library actor as listed in table 440, can be associated with at least one persona-related content. In some instances, that content can include a persona-specific phrasing library identifying a particular word or phrase used by the persona. In some instances, recorded audio of the persona can be available such that the voice of the persona can be used to enhance the response. In some instances, images and/or video associated with the persona could also be used to enhance a presentation of the conversational response 445. For example, an image of or associated with the persona could be applied to a textual response. If the persona is associated with a particular positive or negative recommendation phrase, that phrase can be used to supplement or modify a particular response. In some instances, one or more of the tokens or portion of the response generated by the syntax and semantic generation module 430 can be replaced by the persona-specific content, while in others, the response is supplemented with the persona-specific content.

Once the appropriate persona-specific modification or supplement has been added to the response, the conversational response 445 can be returned to the user 401 (or the client device associated with the user 401) by the NLG engine 428.

Figure 5:
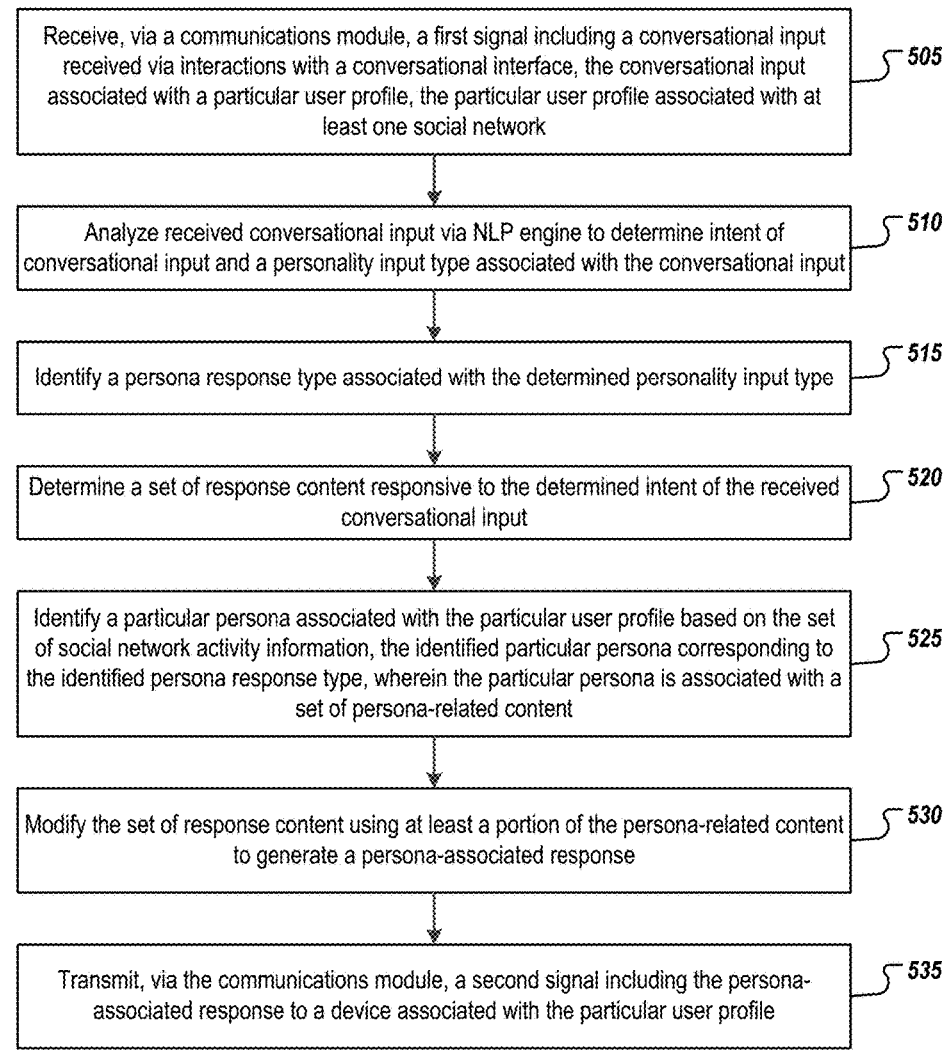
FIG. 5 is a flow chart of an example method performed at a system associated with a conversational interface to transform a responsive output into a persona-specific responsive output based on the corresponding user profile.

FIG. 5 is a flow chart of an example method 500 performed at a system associated with a conversational interface to transform a responsive output into a persona-specific responsive output based on the corresponding user profile. It will be understood that method 500 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 500. In some implementations, the method 500 and related methods are executed by one or more components of the system 100 described above with respect to FIG. 1, or the components described in FIG. 4.

At 505, a first signal including a conversational input associated with interactions with a conversational interface are received via a communications module. The conversational input can include or be associated with an identification of a particular user profile associated with the interaction. In some instances, the identifier may be included in the conversational input or associated through metadata or another suitable manner. In some instances, the conversational input may be received at a specific endpoint associated with a particular conversational interface or related application, such that the analysis of the conversational input is based on the use of the particular conversational interface or related application. Examples may include a digital assistant or a particular website, where the conversational input is to be responded to based on the information obtainable by or related to that particular interface or application.

As previously noted, the conversational input may be or may include text-based input, auditory input (e.g., an audio file), and/or video or image input. The conversational input can be submitted by a user or agent associated with a particular user profile, although for purposes of some implementations of method 500, identification of the particular user profile is not needed to perform the personalization process. In some instances, the received conversational input can represent a particular query, question, or interactive communication, where the conversational output represents a query response, an answer to the question, or a response to the interactive communication.

At 510, the received conversational input is analyzed via a natural language processing engine or service to determine an intent associated with the input and a personality input type based on the input. In some instances, determining the personality input type may include determining a set of lexical personality scores based on the content of the received input. The intent associated with the input can be determined based on any suitable factor, and can be used to determine a meaning of a particular request associated with the conversational input. The intent may be used to determine a particular response to be generated. The lexical personality scores can be used to identify various measures of the received conversational input, and can be compared to a table or existing set of measures that, when combined, are used to identify a particular personality input type. In some instances, two or more personality input types may be associated with a single conversational input, such as "angry" and "scared."

At 515, a persona response type can be identified, where the persona response type is associated with or determined based on the determined personality input type. In some instances, particular personality input types can be mapped to one or more different persona response types, such that once the personality input type is identified the mapping can be considered to determine the corresponding persona response type. In some instances, two or more persona types may be associated with the particular personality input type. In some instances, the persona type may be changed based on a response to be returned. For instance, if the conversational interface is associated with a financial analysis system, and the conversational input's intent is to ask whether a particular transaction should be completed, the response may be a recommendation against the transaction. In such an instance, the persona response type may be associated with a relatively stricter or more serious persona capable of providing additional emphasis to the user that the transaction should not be completed. In the previous example, for instance, the Motherly persona response type can be modified to Strong based on the response content.

At 520, a set of response content responsive to the determined intent of the received conversational input can be determined. As noted, the operations of 520 may be performed before those of 515 in some instances. Alternatively, after the operations of 520, a determination may be made to determine whether to adjust the identified persona response type.

At 525, a particular persona associated with the particular user profile can be identified from a plurality of potential personas based, at least in part, on the social network activity information associated with the particular user profile. The particular persona identified can correspond to, match, or be associated with the identified persona response type (of 515). In some instances, that particular persona may be an exact match to the identified persona response type, while in others, the particular persona may be similar to, but not identical to, the identified persona response type. As noted, the particular persona may be identified based on one or more social network preferences, likes, or other indications as they are related to the entity or person associated with the particular persona. Each of the personas from the plurality of potential personas can be associated with a set of persona-related content. The content may include persona-specific words or phrases, such as a catch phrase or other words commonly associated with the persona. In some instances, those words or phrases may be synonyms of particular words, phrases, or tokens included in the response content, and can replace one or more tokens from the response content. In other instances, the persona-specific words or phrases can be used to supplement and/or otherwise add to the response content, such as by using those words as an emphasis to the underlying response. In some instances, the persona-related content may include one or more embellishments or non-response content, such as an image or video of the person associated with the person. In some instances, the persona-related content may include a set of voice prompts or content that allows at least a portion of the conversational response to be presented in the voice of the particular persona.

At 530, the set of response content is modified, or enhanced, using at least a portion of the persona-related content associated with the particular persona. The result of the modification or enhancement is a persona-associated or persona-specific response. As noted, the modification may be a replacement of at least a portion of the response content with persona-related content, or the modification may be a supplement to the response content with additional persona-related content without removing the initially determined response content.

At 535, a second signal including the persona-associated version of the set of response content is transmitted, via the communications module, to the conversational interface associated with the received first signal. In some instances, that interface is associated with a device associated with the particular user profile.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
   a communications module;
   at least one memory storing instructions and a repository of synonym tokens for association with one or more received inputs, each of the synonym tokens associated with a corresponding predefined lexical personality score; and
   at least one hardware processor interoperably coupled with the at least one memory and the communications module, wherein the instructions instruct the at least one hardware processor to:
   receive, via the communications module, a first signal including a conversational input received via interactions with a conversational interface;
   analyze the received conversational input via a natural language processing engine to determine an intent of the received conversational input and a lexical personality score of the received conversational input, the determined intent and the determined lexical personality score based on characteristics included within the received conversational input, wherein the determined lexical personality score includes at least a first score representing a formality score and a second score representing a politeness score of the received conversational input, wherein the formality score and the politeness score represent respective measures determined based on the characteristics included within the received conversational input;
   determine a set of response content responsive to the determined intent of the received conversational input, the determined set of response content including a set of initial tokens representing an initial response to the received conversational input, wherein the initial response to the received conversational input corresponds to a default lexical personality score;

identify a set of synonym tokens associated with at least some of the set of initial tokens, wherein each of the set of synonym tokens are associated with at least a corresponding formality score and a politeness score;

determine, from the identified set of synonym tokens, at least one synonym token associated with a lexical personality score similar to the determined formality score and politeness score of the received conversational input;

replace at least one token from the set of initial tokens included in the determined set of response content with the at least one determined synonym token corresponding to the determined formality score and politeness score of the received conversational input to generate a modified version of the set of response content; and transmit, in response to the received first signal and via the communications module, a second signal including the modified version of the set of response content to a device associated with the received conversational input.

2. The system of claim 1, wherein the received conversational input comprises a semantic query, wherein the intent of the conversational input is the semantic query.

3. The system of claim 1, wherein the determined lexical personality score of the received conversational input comprises a third score representing an identification of at least one regional phrase included within the received conversational input.

4. The system of claim 1, wherein the received conversational input comprises textual input received via the conversational interface.

5. The system of claim 1, wherein the received conversational input comprises audio input comprising a verbal statement received via the conversational interface.

6. The system of claim 5, wherein the determined lexical personality score of the received conversational input comprises a third score representing a determined accent of a speaker associated with the verbal statement.

7. The system of claim 6, wherein determining the at least one synonym token associated with the lexical personality score similar to the determined lexical personality score of the received conversational input further includes determining at least one synonym token associated with the determined accent.

8. The system of claim 5, wherein the determined lexical personality score of the received conversational input comprises a third score representing a verbal tone of a speaker associated with the verbal statement.

9. The system of claim 8, wherein determining the at least one synonym token associated with the lexical personality score similar to the determined lexical personality score of the received conversational input further includes determining at least one synonym token associated with the determined verbal tone of the speaker.

10. The system of claim 1, wherein each token in the set of initial tokens representing the initial response to the received conversational input comprises a particular phrase within a responsive sentence represented by the set of response content, and wherein each of the identified set of synonym tokens comprises a phrase having a similar meaning to at least one of the particular phrases in the responsive sentence.

11. A non-transitory, computer-readable medium storing computer-readable instructions executable by a computer and configured to:

receive, via a communications module, a first signal including a conversational input received via interactions with a conversational interface;

analyze the received conversational input via a natural language processing engine to determine an intent of the received conversational input and a lexical personality score of the received conversational input, the determined intent and the determined lexical personality score based on characteristics included within the received conversational input, wherein the determined lexical personality score includes at least a first score representing a formality score and a second score representing a politeness score of the received conversational input, wherein the formality score and the politeness score represent respective measures determined based on the characteristics included within the received conversational input;

determine a set of response content responsive to the determined intent of the received conversational input, the determined set of response content including a set of initial tokens representing an initial response to the received conversational input, wherein the initial response to the received conversational input corresponds to a default lexical personality score;

identify a set of synonym tokens associated with at least some of the set of initial tokens, wherein each of the set of synonym tokens are associated with at least a corresponding formality score and a politeness score;

determine, from the identified set of synonym tokens, at least one synonym token associated with a lexical personality score similar to the determined formality score and politeness score of the received conversational input replace at least one token from the set of initial tokens included in the determined set of response content with the at least one determined synonym token corresponding to the determined formality score and politeness score of the received conversational input to generate a modified version of the set of response content; and transmit, in response to the received first signal and via the communications module, a second signal including the modified version of the set of response content to a device associated with the received conversational input.

12. The computer-readable medium of claim 11, wherein the received conversational input comprises textual input received via the conversational interface.

13. The computer-readable medium of claim 11, wherein the received conversational input comprises audio input comprising a verbal statement received via the conversational interface.

14. The computer-readable medium of claim 13, wherein the determined lexical personality score of the received conversational input comprises a third score representing a determined accent of a speaker associated with the verbal statement, and wherein determining the at least one synonym token associated with the lexical personality score similar to the determined lexical personality score of the received conversational input further includes determining at least one synonym token associated with the determined accent.

15. The computer-readable medium of claim 13, wherein the determined lexical personality score of the received conversational input comprises a third score representing a verbal tone of a speaker associated with the verbal statement, and wherein determining the at least one synonym token associated with the lexical personality score similar to the determined lexical personality score of the received conversational input further includes determining at least one synonym token associated with the determined verbal tone of the speaker.

16. A computerized method performed by one or more processors, the method comprising:

receiving, via a communications module, a first signal including a conversational input received via interactions with a conversational interface;

analyzing the received conversational input via a natural language processing engine to determine an intent of the received conversational input and a lexical personality score of the received conversational input, the determined intent and the determined lexical personality score based on characteristics included within the received conversational input, wherein the determined lexical personality score includes at least a first score representing a formality score and a second score representing a politeness score of the received conversational input, wherein the formality score and the politeness score represent respective measures determined based on the characteristics included within the received conversational input;

determining a set of response content responsive to the determined intent of the received conversational input, the determined set of response content including a set of initial tokens representing an initial response to the received conversational input, wherein the initial response to the received conversational input corresponds to a default lexical personality score;

identifying a set of synonym tokens associated with at least some of the set of initial tokens, wherein each of the set of synonym tokens are associated with at least a corresponding formality score and a politeness score;

determining, from the identified set of synonym tokens, at least one synonym token associated with a lexical personality score similar to the determined formality score and politeness score of the received conversational input;

replacing at least one token from the set of initial tokens included in the determined set of response content with the at least one determined synonym token corresponding to the determined formality score and politeness score of the received conversational input to generate a modified version of the set of response content; and transmitting, in response to the received first signal and via the communications module, a second signal including the modified version of the set of response content to a device associated with the received conversational input.

* * * * *

UNITED STATES PATENT AND TRADEMARK OFFICE
CERTIFICATE OF CORRECTION

PATENT NO. : 10,460,748 B2
APPLICATION NO. : 15/725095
DATED : October 29, 2019
INVENTOR(S) : Tseretopoulos et al.

It is certified that error appears in the above-identified patent and that said Letters Patent is hereby corrected as shown below:

In the Specification

In Column 19, Line 1, please replace "For" with -- for --

Signed and Sealed this
Fourteenth Day of January, 2020

Andrei Iancu
*Director of the United States Patent and Trademark Office*